June 18, 1935. J. C. DIEHL 2,005,025
TANGENT
Filed Aug. 25, 1933
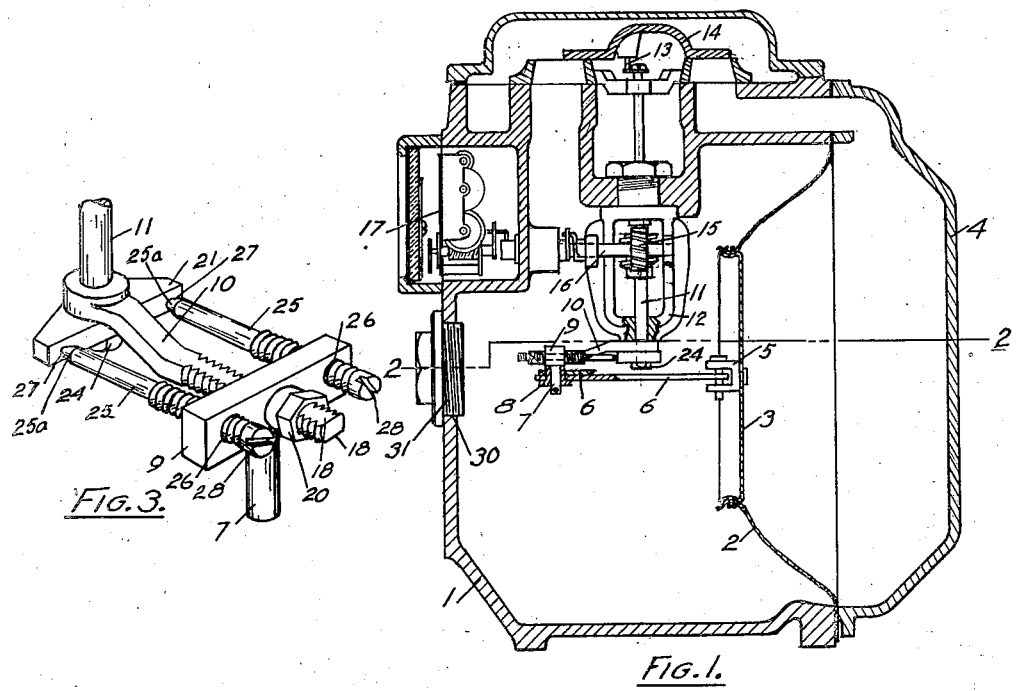
INVENTOR.
John C. Diehl
BY
ATTORNEYS.

Patented June 18, 1935

2,005,025

UNITED STATES PATENT OFFICE 2,005,025

TANGENT

John C. Diehl, Erie, Pa., assignor to American Meter Company, New York, N. Y., a corporation of Delaware Application August 25, 1933, Serial No. 686,803

8 Claims. (Cl. 73—1)

Most fluid actuated gas meters are provided with a tangent which takes the movement from the diaphragms and transmits it to the controlling shaft. It is desirable with these tangents to have them adjustable so that the throw of the tangent, or crank, involved in its structure may be made greater, or less, to adjust the throw to variations in the diaphragms. It is also desirable to have the tangent adjustable rotatively on the shaft so that the timing of the valve, or other mechanism controlled by the tangent may be adjusted with relation to the action of the diaphragms. The present invention is designed to simplify the tangent structure and to provide a more certain and definite adjustment and one in which the adjustment may be conveniently made. Features and details of the invention will appear from the specification and claims.

A preferred exemplification of the invention is illustrated in the accompanying drawing as follows:—

Fig. 1 is a vertical section on the lines 1—1 in Fig. 2.

Fig. 2 a section on the lines 2—2 in Fig. 1.

Fig. 3 a perspective view of the tangent.

Fig. 4 a perspective view of the end of the controlling shaft.

Fig. 5 a perspective view of the cross arm.

Fig. 6 a perspective view of the cross head.

1 marks the case of the gas meter, 2 the flexible part of the diaphragm, 3 the disc on the diaphragm, 4 the cover forming with the diaphragm one of the meter chambers, 5 a bracket on the disc, 6 a link pivotally mounted with the bracket 5 and extending to a tangent post 7. The pivotal connection between the link 6 and the tangent post is provided with a bushing 8. In the exemplification of the meter shown there are two of the diaphragms and two links 6 extending to the same tangent post.

The post is mounted on a cross head 9 and the cross head is mounted on a tangent arm 10. The tangent arm is rotatively mounted on a controlling shaft 11. The controlling shaft 11 is journaled in a fitting 12 secured in the case and extends up into the valve chamber and is provided with a crank 13 which operates the meter valve 14. A worm gear 15 is also driven by a worm (not shown) on the control shaft 11 and this worm gear drives a shaft 16 which in turn drives a dial 17.

The tangent arm has flattened portions 18 and the cross head has an elongated opening 19 by means of which it is slidingly mounted on the tangent arm but locked against rotation thereon. The tangent arm is also screw-threaded and a nut 20 is provided engaging the cross head. A cross arm 21 is fixedly mounted on the shaft 11. This cross arm has an elongated opening 22 which engages an end 23 on the bottom of the control shaft, the end 23 having a shape corresponding to the elongated opening 22. A nut 24 is screwed on to the bottom of the control shaft clamping the cross arm in place.

Adjusting screws 25 extend through screw-threaded openings 26 in the cross head and extend into cone-shaped sockets 27 in the cross arm, the ends of the screws being pointed at 25a so as to make a point engagement between the bottom of the socket and the end of the screw. These screws are provided with slots 28 by means of which they may be operated through the action of an ordinary screw driver 29.

From this construction it will readily be seen that by loosening the screws 25 and tightening the nut 20 the throw of the tangent may be decreased and by a reversal of this operation the throw may be increased. The adjustment may be positively locked by the counteraction between the nut 20 and the screws 25. The control shaft may be adjusted rotatively by the rocking of the cross arm 21 at any adjustment of the tangent. This is accomplished by loosening one of the screws 25 and tightening the opposite screw 25. In this way the cross arm may be adjusted to rotatively adjust the control shaft in either direction depending on which screw 25 is loosened and which is tightened. The nut 20 may be operated by an ordinary socket wrench, the screws 25 by an ordinary screw driver, and these tools all operate from the same direction with relation to the tangent so that a complete adjustment may be accomplished with the tangent set in one position. As shown the case has an opening 30 through which the adjusting tools may be extended. This is ordinarily closed by a plug 31.

What I claim as new is:—

1. In a tangent, the combination of a shaft; a cross arm fixed on the shaft; a tangent arm rotatively mounted on the shaft; a cross head on the tangent arm; a tangent post on the cross head; and a screw connection between the head and the cross arm adjusting the tangent arm.

2. In a tangent, the combination of a shaft; a cross arm fixed on the shaft, said cross arm extending from opposite sides of the shaft; a tangent arm rotatively mounted on the shaft; a cross head on the tangent arm and extending to opposite sides of the tangent arm; a tangent post on the cross head; and screw connections extending between the cross head and the cross arm at opposite sides of the tangent arm adjusting the tangent arm.

3. In a tangent, the combination of a shaft; a cross arm fixed on the shaft; a tangent arm rotatively mounted on the shaft; a cross head adjustably mounted on the tangent arm and adjustable thereon toward and from the shaft; a tangent post on the cross head; and a screw connection between the head and the cross arm adjusting the tangent arm.

4. In a tangent, the combination of a shaft; a cross arm fixed on the shaft, said cross arm extending from opposite sides of the shaft; a tangent arm rotatively mounted on the shaft; a cross head adjustably mounted on the tangent arm and adjustable thereon toward and from the shaft; a tangent post on the cross head; and screw connections extending between the cross head and the cross arm at opposite sides of the tangent arm adjusting the tangent arm.

5. In a tangent, the combination of a shaft; a cross arm fixed on the shaft; a tangent arm rotatively mounted on the shaft, said tangent arm being screw-threaded; a cross head slidingly mounted on the tangent arm; a tangent post on the cross head; a screw connection between the head and cross arm; and a nut on the tangent arm engaging the cross head.

6. In a tangent, the combination of a shaft; a cross arm fixed on the shaft and extending to opposite sides thereof; a tangent arm rotatively mounted on the shaft, said tangent arm being screw-threaded; a cross head on the tangent arm extending to opposite sides of the arm; a tangent post on the cross head; a screw connection between the head and cross arm; and a nut on the tangent arm engaging the cross head.

7. In a tangent, the combination of a shaft; a cross arm fixed on the shaft; a tangent arm rotatively mounted on the shaft, said tangent arm being screw-threaded and flattened; a cross head having an elongated opening through which the tangent arm extends, the cross head being slidingly mounted on the tangent arm; a tangent post on the cross head; a screw connection between the head and the cross arm; and a nut on the tangent arm engaging the cross head.

8. In a tangent, the combination of a shaft; a cross arm fixed on the shaft and extending to opposite sides of the shaft; a tangent arm rotatively mounted on the shaft, said tangent arm being screw-threaded; a cross head slidingly mounted on the tangent arm, said cross head having screw-threaded openings therein at opposite sides of the tangent arm; a tangent post on the cross head; screws arranged in the screw-threaded openings in the cross head and engaging the cross arm; and a nut on the tangent arm engaging the cross head.

JOHN C. DIEHL.